United States Patent

Washburn

[15] 3,637,035
[45] Jan. 25, 1972

[54] SNOWMOBILE

[72] Inventor: Brice P. Washburn, Box 40-A, Los Lunas, N. Mex. 87031

[22] Filed: Nov. 7, 1969

[21] Appl. No.: 874,890

[52] U.S. Cl. ..............................180/5 R, 180/9.5, 180/9.64, 180/41
[51] Int. Cl. .......................................B62m 27/02
[58] Field of Search .....................180/5, 5 A, 9.5, 9.52, 9.54, 180/9.64, 41

[56] References Cited

UNITED STATES PATENTS

| 1,154,431 | 9/1915 | Ramsdell | 180/5 A |
| 1,280,444 | 10/1918 | Gross | 180/4 |
| 2,967,578 | 1/1961 | Schomers | 180/41 X |
| 3,446,303 | 5/1969 | Trapp | 180/9.5 |

FOREIGN PATENTS OR APPLICATIONS

| 584,437 | 10/1958 | Italy | 180/9.5 |

Primary Examiner—Richard J. Johnson
Attorney—Imirie, Smiley, Snyder & Butrum

[57] ABSTRACT

The chassis of a snowmobile is supported at either side thereof by endless tread assemblies which are connected to each other such that as one track assembly is raised, the other lowers and vice versa, thus allowing the chassis to remain vertical while traversing a slope or to permit the chassis to be leaned into a turn for better weight distribution or placement of the center of gravity of the vehicle and to incline the endless tread devices correspondingly inwardly with respect to the turn to obtain a better bite on the snow surface. The suspension mechanism also operates to couple the prime mover which is mounted on the chassis to the drive sprockets of the endless tread devices. Each track assembly includes an elongate frame mounting a drive sprocket at its rear end and an idler sprocket at its forward end, over which sprocket an endless tread member is trained and each further includes a forward extension projecting beyond the endless track member and which carries a ski at its forward extremity, the skis "feeling" the terrain ahead of the endless treads tending to "telegraph" variations in terrain to the tread assemblies while also accommodating for steering action of the vehicle.

14 Claims, 6 Drawing Figures

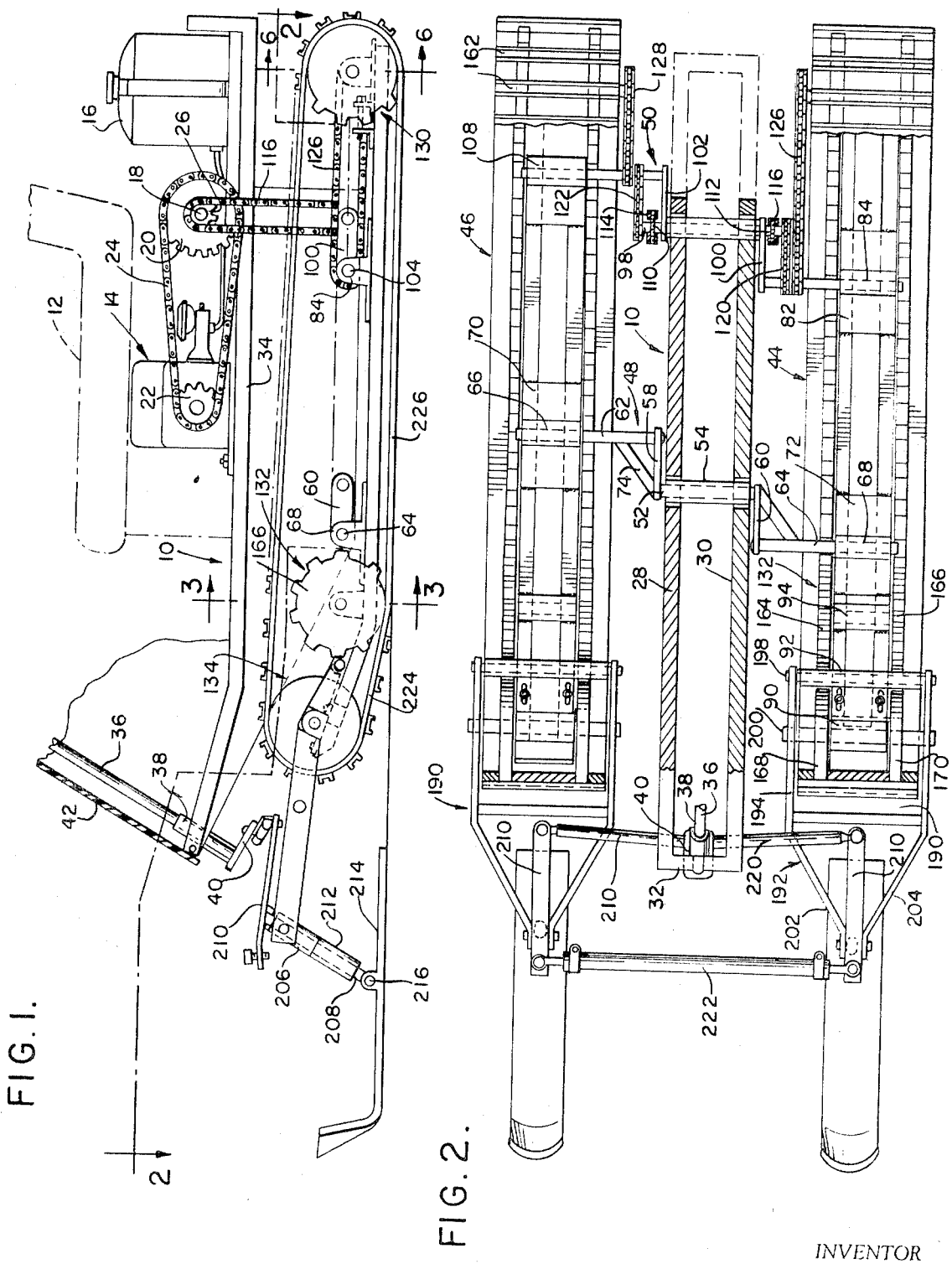

INVENTOR
BRICE P. WASHBURN
BY Imirie, Smiley, Snyder & Butrum

ATTORNEYS

INVENTOR
BRICE P. WASHBURN

SNOWMOBILE

BACKGROUND OF THE INVENTION

Powered vehicles capable of travelling over snow-covered terrain and which include a rigid chassis and endless tread devices fixed thereto and provided also with dirigible skis at the forward end of the chassis contemporarily enjoy widespread usage but the general arrangement of the component parts of these vehicles leaves much to be desired as to maneuverability, safety and riding comfort. These vehicles conventionally are of relatively narrow track and consequently are propense to tipping over when traversing steep slopes or while negotiating sharp turns at high speeds and since they employ little or only rudimentary suspension mechanism, the devices contemporarily employed are very rough riding and are not characterized by good handling qualities.

BRIEF SUMMARY OF THE INVENTION

Accordingly, it is of primary concern in connection with the present invention to provide an improved form of vehicle of the type described hereinabove wherein means is provided for allowing the chassis to remain upright while the vehicle is traversing a steep slope and wherein, also, an improved track assembly is provided wherein the dirigible skis associated with the track assemblies anticipate changes in terrain elevation and allow a smoother travel of the track or tread assemblies thereover.

The invention embodies a chassis and separate track assemblies connected to the chassis on either side thereof and interconnected by the means which supports them or connects them to the chassis in such fashion that in response to relative vertical upward movement of one track assembly, the other track assembly is forced downwardly a like amount. This arrangement is achieved by the utilization of cross linkages in the form of shafts journaled transversely in the chassis and provided at their opposite ends with forwardly and rearwardly directed lever arms which carry outwardly directed pivot shafts which are journaled in the track assembly. Thus, although the linkage assemblies adequately support the chassis at all times, they constrain the track assembly to move in opposite directions in planes parallel to the vertical plane of the chassis, thus allowing the vehicle to traverse slopes with the chassis remaining upright and also allowing the chassis to be leaned into a turn by shifting of the body weight of the occupant thereby to cant or tilt the track assemblies and achieve a better bite in the snow surface while, at the same time, improving the center of gravity location of the vehicle assembly with respect to the inertia forces acting to overturn the vehicle incidental to the turning action.

Additionally, the suspension linkage is employed for mounting mechanism which couples the prime mover mounted on the chassis to the drive sprockets for the endless tread devices and for allowing simple chain and sprocket interconnections to be made which, in response to movement of the suspension means, are not altered such that the center distances between sprockets is changed. Additionally, the arrangement allows the track assemblies to be removed separately from the vehicle in a very short period of time, and if necessary, a track assembly may be removed in the field and a temporary runner positioned in place thereof so that the vehicle may travel and operate under the power of the remaining track assembly which is not damaged.

BRIEF DESCRIPTION OF THE DRAWINGS

FIG. 1 is a side elevational view, partly in section, illustrating certain basic components of the present invention;

FIG. 2 is a horizontal section taken substantially along the plane of section line 2—2 in FIG. 1 and illustrating details of the suspension, steering and track assemblies;

DETAILED DESCRIPTION OF THE INVENTION

Figure 3:
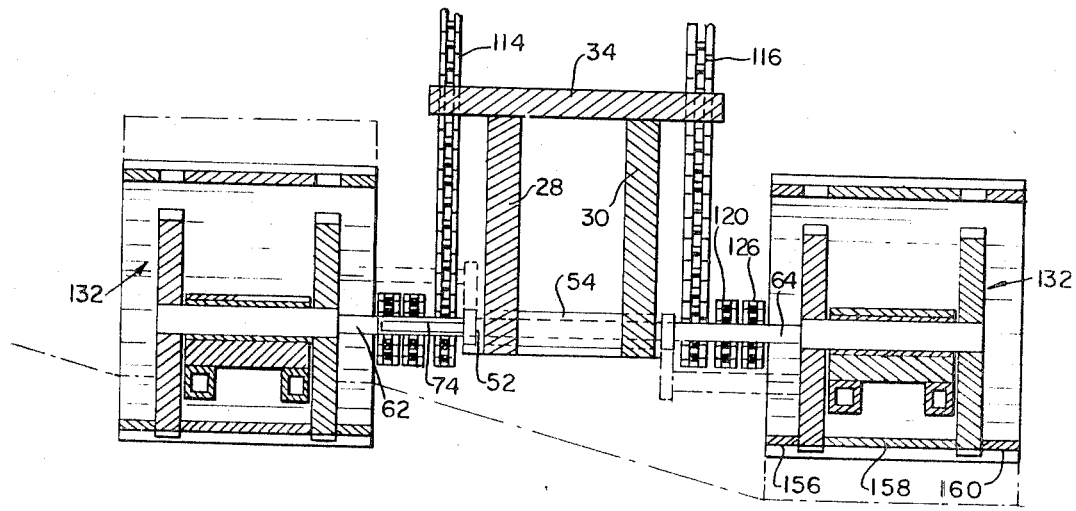
FIG. 3 is an enlarged vertical section taken substantially along the plane of section line 3—3 in FIG. 1 and illustrating details of the intermediate idler assembly and also details of the drive assembly.

With reference now more particularly to FIG. 1, reference character 10 indicates in general the chassis of the vehicle according to the present invention and which is adapted to mount an operatr's seat 12 and a prime mover indicated generally by the reference character 14 which may be of conventional type such as an internal combustion engine. The chassis additionally mounts a suitable supply tank 16 for fuel and a transversely extending power takeoff shaft 18 suitably journaled transversely of the chassis as for example by suitable pillow blocks and which shaft is provided with a sprocket 20 fixed thereto in alignment with the drive sprocket 22 of the prime mover 14 and to which it is connected by means of a suitable chain 24, substantially as is shown. The shaft 18 extends beyond the opposite sides of the chassis as will hereinafter more particularly appear and is provided adjacent its two outboard ends with the power takeoff sprockets 26, one of which is shown in FIG. 1.

The chassis 10 may be constructed with a generally box shaped undercarriage as is shown in FIG. 2, presenting the opposite side frame members 28 and 30 interconnected at their opposite ends by the crossframe members 32 and which undercarriage may be surmounted by a generally horizontal platform 34 as may be seen in FIG. 1. The forward end of the chassis is provided with a steering column or shaft 36 suitably aligned axially and rotatably mounted by bearings such as that shown adjacent the lower end of the steering column and indicated by the reference character 38. The lower end of the steering column mounts a pitman arm 40 for steering purposes as will hereinafter be pointed out. Additionally, the chassis may include an enclosing body portion, a portion of which is indicated by the reference character 42 in FIG. 1.

As may be seen in FIG. 2, track assemblies 44 and 46 are located at either side of the chassis 10 and support the same in elevated relationship thereto through the medium of the support means indicated generally by the reference characters 48 and 50. The forward suspension means 48 comprises a supporting shaft 52 which extends transversely through the undercarriage of the chassis and is journaled in a suitable bushing sleeve 54 fixed to the undercarriage between the opposite side frame members 28 and 30 thereof and at the opposite ends of the shaft 52 there are provided the crank arms 58 and 60, such crank arms being rigid with the shaft such that as the free end of one crank arm rotates upwardly, the opposite one rotates downwardly as will be evident from FIG. 2. The free ends of the arms 58 and 60 carry the respective outwardly projecting shaft portions 62 and 64 which project through and are journaled in the bushing members 66 and 68 of the track assemblies, such bushings being mounted for convenience on suitable base plate members 70 and 72, substantially as is shown.

Figure 5:
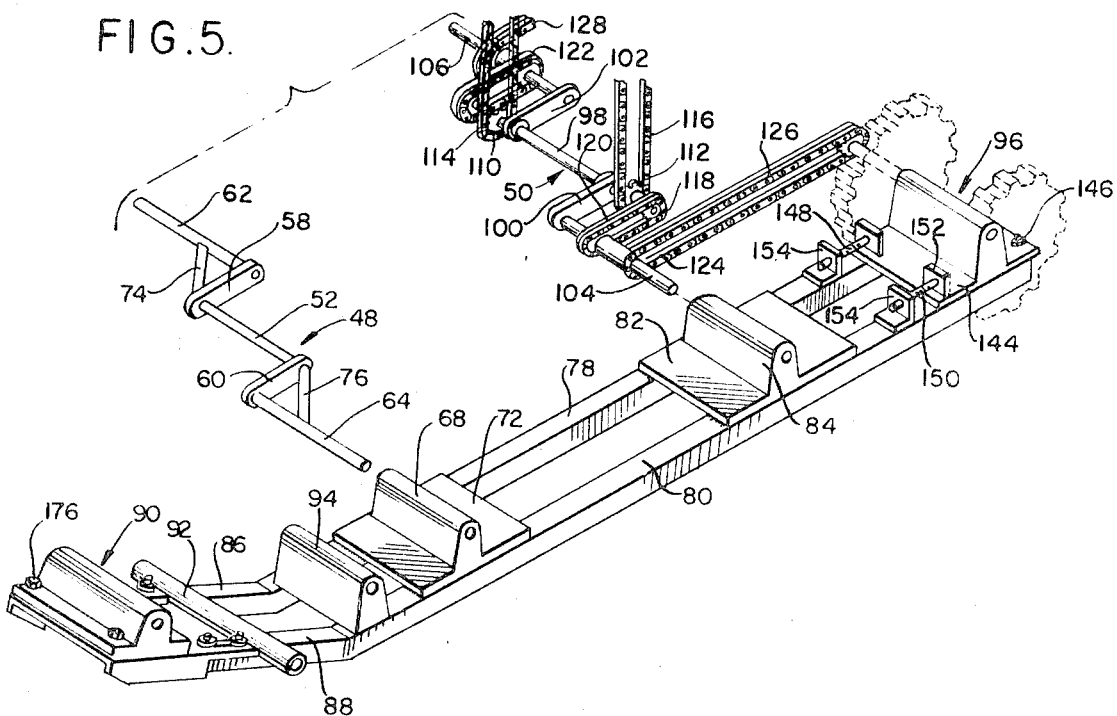
FIG. 5 is an exploded perspective view showing one of the track frames and portions of the associated suspension and drive means.

The construction of the track assembly frames may be seen more clearly in FIG. 5, FIG. 5 also illustrating the suspension means 48 and 50. As may be seen in FIG. 5, the crank arms 58 and 60 extend in relatively opposite directions from the shaft portion 52 and may be reinforced or braced by the members 74 and 76 as illustrated and it will be understood that the shaft portion 62 and 64 may be provided with suitable means for locating track frame assemblies laterally. Each track frame assembly includes side rail portions 78 and 80 disposed in longitudinally extending and spaced parallel relationship and which may be tied together by the aforementioned base plate 72 and by an additional base plate 82 provided for the bushing 84 which mounts a corresponding portion of the rear suspension assembly 50 as will be described hereinafter.

It will be noted that the forward end portions 86 and 88 of the side frame members 78 and 80 are upwardly inclined and are provided with bearing block assemblies indicated generally by the reference character 90, the purpose and construction of which will be presently apparent. Located just behind the bearing block assembly 90 is an anchor tube 92, the purpose of which will likewise be presently apparent. Between the anchor tube 92 and the bearing member 68 there is located an additional bearing member 94 and, lastly, at the rearward end of the frame, in each case, a further bearing block assembly 96 is located, same being adapted for longitudinal adjustment on the frame for purposes presently apparent.

The rear suspension assembly 50 is similar in many respects to the forward suspension assembly 48 and includes the central shaft portion 98 and the oppositely directed crank arms 100 and 102, the latter of which carry the shaft portions 104 and 106 received respectively in the bearing member 84 and the bearing member 108, see particularly FIG. 2. As may be seen better in FIG. 2, the opposite ends of the central shaft portion 98 of the rear suspension means 50 project outwardly beyond the respective crank arms 100 and 102 and journaled thereon are the double sprocket assemblies, the inner ones 110 and 112 of which are aligned with the respective sprockets described in conjunction with FIG. 1 which are fixed to the power takeoff shaft 18 and these aligned sprockets are interconnected by the chains 114 and 116 whereby power transmitted from the prime mover 14 is transmitted to these two double sprocket assemblies. The outer sprocket of each double sprocket set, such as the sprocket 118 as indicated in FIG. 5 is correspondingly driven and these outer sprockets are coupled through the medium of the chains 120 and 122 to respective inner sprockets of a second pair of double sprockets journaled respectively on the shaft portions 104 and 106. The outer sprocket of each of these second sets of double sprocket assemblies, such as the sprocket 124 illustrated in FIG. 5 are coupled by means of chains 126 and 128 to the respective drive sprockets or toothed wheels of the tread assemblies.

Figure 6:
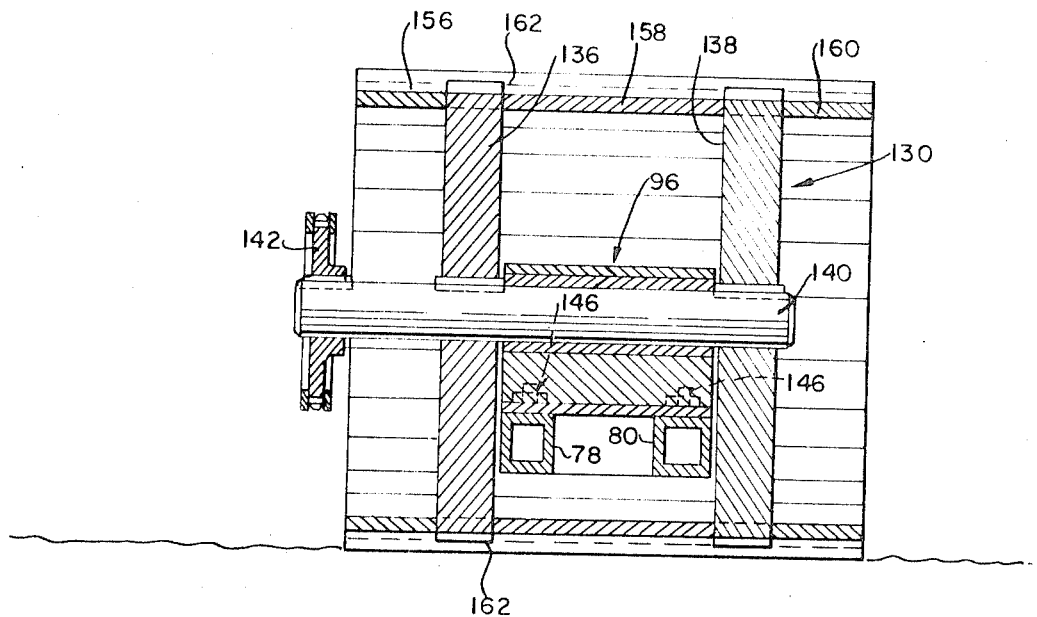
FIG. 6 is an enlarged vertical section taken substantially along the plane of section line 6—6 in FIG. 1 and illustrating details of the drive sprockets for the endless tread devices.

Each track assembly includes a drive sprocket arrangement 130, an intermediate idler sprocket assembly 132 and a forward or main idler wheel or sprocket assembly 134, which are respectively journaled in the bearing block portions 96, 94 and 90 as may be seen in FIGS. 1, 2 and 5. As may be seen in FIG. 6, the drive sprocket arrangement 130 comprises a pair of toothed wheels 136 and 138 suitably feathered or otherwise keyed to an axle shaft 140 journaled in the bearing block 96 and which is provided with an extended inboard end portion to which a sprocket 142 is affixed in alignment with the sprocket 124 as shown in FIG. 5 for example for interconnection of these two sprockets by the chain 126. A similar arrangement obtains for the opposite side. The endless tread or track is preferably constructed as three separate endless belts 156, 158 and 160 which are separated as shown in FIG. 6 to provide spaces or slots accommodating the drive wheels 136 and 138 and allowing their teeth to project therebetween. The several belts 156, 158 and 160 are preferably constructed of rubber or like material and are joined by longitudinally spaced metal cleats 162 which are spaced apart sufficiently to accommodate adjacent teeth of the drive wheels 136 and 138. The intermediate idler sprocket assembly 132 for each track assembly similarly includes a pair of toothed wheels 164 and 166 as shown in FIG. 2 and the main or forward idler assembly 134 may simply be in the form of spaced wheels 168 and 170.

Figure 4:
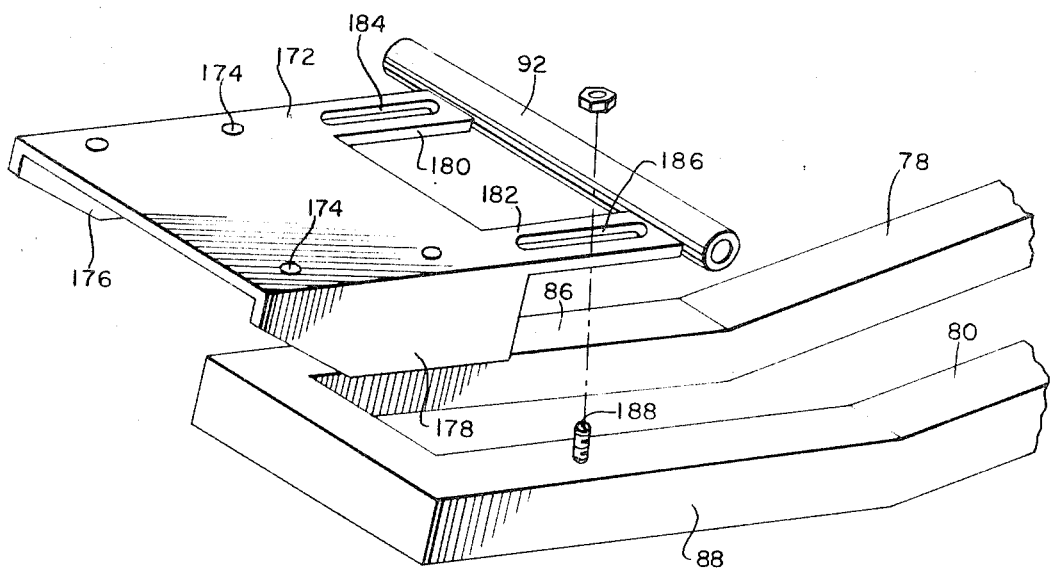
FIG. 4 is an exploded perspective view showing an end portion of one of the track frames.

As is illustrated in FIG. 4, the mounting pad 172 for the bearing block 90 is in the form of a plate provided with threaded openings 174 for the reception of fasteners 176, see FIG. 5, to affix the bearing block 90 thereto and includes the oppositely disposed depending sidewall portions 176 and 178 which straddle the upwardly inclined side frame portions 86 and 88. The plate includes the trailing portions 180 and 182 provided with elongate slots 184 and 186 accommodating the respective studs 188 affixed to the side frame members 86 and 88 for allowing the mounting plate to be shifted longitudinally fore and aft of the vehicle thereby to adjust the tension on the track or tread assemblies. The arms 180 and 182 are integrally connected by means of the previously mentioned anchor tube 92, the purpose of which will now be described in conjunction with FIG. 2.

The forward end of each track assembly is provided with an extension as indicated by the reference characters 190 and 192, each of which includes parallel trailing arm portions 194 and 196 which are apertured to receive the throughshafts 198 and 200 respectively received in the tubes 92 and the bearing blocks 90. Thus, the arms 194 and 196 are rigidly affixed to the endless tread assemblies and the convergent forward end portions 202 and 204 are interconnected by a bearing collar 206 as shown in FIG. 1. The bearing collar 206 receives the upper end of a shaft 208 whose upper extremity in each case has a steering arm 210 affixed thereto and below the collar 206, a supporting collar 212 is affixed to the shaft 208. The lower end of each shaft 208 mounts a ski 214 by means of a suitable transverse pivot pin 216 to allow the skis to rock for accommodating to the terrain over which they are travelling. The rearward ends of the steering arms 210 are coupled to the pitman arm 40 by suitable drag links 218 and 220 and in order to rigidify the assemblage, the forward extremities of the steering arms 210 may be interconnected by a tie rod member 222.

The suspension means 48 and 50 as described will be seen to allow the chassis 10 to be supported between the endless tread assemblies 44 and 46 in such fashion as to remain upright or in a vertical plane when traversing a slope, as is shown in FIG. 3. At the same time, this suspension means will be seen to allow the body to be leaned inwardly with respect to a turn, for example, correspondingly to cant or tilt the endless treads inwardly to obtain a better bite on the snow. The arrangement of the dirigible skis attached to the endless track assemblies rather than to the chassis directly also allows a smoother ride to be obtained above and beyond that which is accomplished by virtue of the suspension means 48 and 50 by themselves. This is particularly true by virtue of the fact that the forward portion 224 of the lower flight of the endless treads, as may be seen in FIG. 1, inclines upwardly between the intermediate idler assembly 132 and the main or forward idler assembly 134 whereas the skis 214 are normally disposed substantially coplanar with the rearward and main supporting portions 226 of the lower flight portions of the endless treads. Thus, the endless treads do not have a tendency to "plow" and, in addition, the forwardly extended skis form supports which precede the endless treads and thus anticipate undulations or diviations in the terrain which might otherwise cause abrupt movements of the endless treads and thus anticipate undulations or deviations in the terrain which might otherwise cause abrupt movements of the endless treads.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. An endless track vehicle for travel over snow-covered terrain comprising, in combination;

a pair of endless track assemblies disposed in spaced-apart parallel relation;

a chassis assembly extending longitudinally between said track assemblies in elevated position relative thereto;

suspension means carried by said chassis and interconnecting said track assemblies for constraining the latter to move in relatively opposite vertical directions with respect to said chassis;

means for driving said endless track assemblies; and means for steering said vehicle, said means for steering comprising a ski disposed ahead of each track assembly, means mounting each ski on its respective track assembly for articulation in a vertical direction and for turning motion in horizontal direction, tie rod means interconnecting said skis, and means for turning said skis.

2. The endless track vehicle as defined in claim 1 wherein said suspension means comprises a pair of shafts extending transversely though said chassis in longitudinally spaced relation to each other, each shaft being journaled in said chassis and being provided with relatively oppositely directed arms at its opposite ends and with a laterally outwardly directed pivot shaft at the free end of each arm, the arms at one side of said chassis extending forwardly of the vehicle and the arms at the other side of said chassis extending rearwardly of the vehicle, and said pivot shafts being journaled to said track assemblies.

3. An endless track vehicle for travel over snow-covered terrain comprising, in combination;
  a pair of endless track assemblies disposed in spaced-apart parallel relation;
  a chassis assembly extending longitudinally between said track assemblies in elevated position relative thereto;
  suspension means carried by said chassis and interconnecting said track assemblies for constraining the latter to move in relatively opposite vertical directions with respect to said chassis;
  means for driving said endless track assemblies; and
  means for steering said vehicle, said suspension means comprising a pair of shafts extending transversely through said chassis in longitudinally spaced relation to each other, each shaft being journaled in said chassis and being provided with relatively oppositely directed arms at its opposite ends and with a laterally outwardly directed pivot shaft at the free end of each arm, the arms at one side of said chassis extending forwardly of the vehicle and the arms at the other side of said chassis extending rearwardly of the vehicle, and said pivot shafts being journaled to said track assemblies, each endless track assembly including a frame, a tread drive sprocket journaled at the rear of said frame, an idler sprocket journaled at the front of said frame, and an endless tread device trained about said sprockets;
  an intermediate chain sprocket journaled on each end of the rearward shaft of said suspension means; and 4. The endless track vehicle as defined in claim 3 wherein said means for steering includes a ski fixed to he forward end of each track assembly in forwardly displaced relation thereto, each ski being dirigible and being mounted for pivoted motion about a transverse horizontal pivot.

5. An endless track vehicle for travel over snow-covered terrain comprising, in combination;
  a pair of endless track assemblies disposed in spaced-apart parallel relation;
  a chassis assembly extending longitudinally between said track assemblies in elevated position relative thereto;
  suspension means carried by said chassis and interconnecting said track assemblies for constraining the latter to move in relatively opposite vertical directions with respect to said chassis;
  means for driving said endless track assemblies; and
  means for steering said vehicle each endless track assembly including a frame, a tread drive sprocket journaled at the rear of said frame, an idler sprocket journaled at the front of said frame, and an endless tread device trained about said sprockets;
  said means for steering including an extension fixed to each track frame and projecting forwardly thereof beyond he associated endless tread device, a support shaft journaled in the forward portion of each extension and inclining forwardly and downwardly therefrom, a ski pivotally connected about a horizontal transverse axis to the lower end of each support shaft, and a steering arm connected to the upper end of each support shaft.

6. The endless track vehicle as defined in claim 5 including a tie rod pivotally connected at its opposite ends of said steering arms, a drag link pivotally connected at one end to the rearward end of an associated steering arm, and a pitman arm pivotally carried by said chassis and to which the opposite ends of said drag links are connected.

7. An endless track vehicle for travel over snow-covered terrain comprising in combination;
  a pair of endless track assemblies disposed in spaced-apart parallel relation;
  a chassis assembly extending longitudinally between said track assemblies in elevated position relative thereto;
  suspension means including a rearward shaft carried by said chassis and interconnecting said track assemblies for constraining the latter to move in relatively opposite vertical directions with respect to said chassis;
  means for driving said endless track assemblies; and
  means for steering said vehicle each endless track assembly including a frame, a tread drive sprocket journaled at the rear of said frame, an idler sprocket journaled at the front of said frame, and an endless tread device trained about said sprockets;
  an intermediate chain sprocket journaled on each end of the rearward shaft of said suspension means; and
  a driven chain sprocket fixed to the inboard ends of said tread drive sprockets in alignment with respective ones of said intermediate chain sprockets;
  said means for driving including means for driving said intermediate chain sprockets.

8. The endless track vehicle as defined in claim 7 wherein said means for steering includes a ski fixed to the forward end of each track assembly in forwardly displaced relation thereto, each ski being dirigible and being mounted for pivoted motion about a transverse horizontal pivot.

9. An endless track vehicle for travel over snow-covered terrain comprising, in combination;
  a pair of endless track assemblies disposed in spaced-apart parallel relation;
  a chassis assembly extending longitudinally between said track assemblies in elevated position relative thereto;
  suspension means carried by said chassis and interconnecting said track assemblies for constraining the latter to move in relatively opposite vertical directions with respect to said chassis;
  means for driving said endless track assemblies; and
  means for steering said vehicle each endless track assembly including a frame, a tread drive sprocket journaled at the rear of said frame, an idler sprocket journaled at the front of said frame, and an endless tread device trained about said sprockets;
  an intermediate chain sprocket journaled on each end of the rearward shaft of said suspension means; and
  a driven chain sprocket fixed to the inboard ends of said tread drive sprockets in alignment with respective ones of said intermediate chain sprockets;
  said means for driving including means for driving said intermediate chain sprockets;
  said means for steering including an extension fixed to each track frame and projecting forwardly thereof beyond the associated endless tread device, a support shaft journaled in the forward portion of each extension and inclining forwardly and downwardly therefrom, a ski pivotally connected about a horizontal transverse axis to the lower end of each support shaft, and a steering arm connected to the upper end of each support shaft.

10. The endless track vehicle as defined in claim 9 including a tie rod pivotally connected at its opposite ends to the forward ends of said steering arms, a drag link pivotally connected at one end to the rearward end of an associated steering arm, and a pitman arm pivotally carried by said chassis and to which the opposite ends of said drag links are connected.

11. An endless track vehicle for travelling over snow-covered terrain, comprising in combination;
  a chassis comprising an elongate frame provided with an occupant's seat and a prime mover;

a track assembly at each side of said chassis, each track assembly including an elongate frame, a drive sprocket journaled at the rear of the an intermediate idler sprocket journaled just behind the forward end of said frame in alignment with said drive sprocket, a main idler sprocket journaled at the forward end of said frame in elevated position with respect to said drive and intermediate idler sprockets, an endless tread member trained about said drive and main idler sprockets and having its lower flight passing beneath said intermediate idler sprocket whereby the forward portion of said lower flight slopes upwardly from said intermediate idler sprocket and said main idler sprocket, while the remaining rearward portion of said lower flight extends horizontally between said intermediate idler and drive sprockets, an extension for said frame projecting forwardly beyond said endless tread member, and a dirigible ski carried by the forward end of said extension, said ski having a runner surface normally disposed substantially coplanar with said rearward portion of said lower flight;

means for steering the skis; and means supporting said chassis from said track assemblies for retaining said chassis in upright position despite relative vertical movement between said track assemblies.

12. The vehicle according to claim 11 wherein the last-mentioned means comprises a pair of shafts journaled in and extending transversely of said chassis, a pair of rearwardly extending cranks fixed to the respective ends of said shafts at one side of said chassis, a pair of forwardly extending cranks fixed to the respective ends of said shafts at the other side of said chassis; and means journaling said cranks to respective ones of said frames.

13. The vehicle according to claim 12 wherein the rearward one of said shafts carries means coupling said prime mover to said drive sprockets.

14. The vehicle according to claim 12 wherein the last-mentioned means includes mechanisms coupling said prime mover to said drive sprockets.

* * * * *